United States Patent [19]

Thalmann

[11] Patent Number: 4,655,480
[45] Date of Patent: Apr. 7, 1987

[54] MOLDED TAPPING MEMBER FORMED OF A WELDABLE PLASTICS MATERIAL

[75] Inventor: Alfred Thalmann, Uhwiesen, Switzerland

[73] Assignee: Georg Fischer Aktiengesellschaft, Schaffhausen, Switzerland

[21] Appl. No.: 762,953

[22] Filed: Aug. 6, 1985

[30] Foreign Application Priority Data

Aug. 8, 1984 [CH] Switzerland .................... 3811/84

[51] Int. Cl.⁴ .............................................. F16L 5/00
[52] U.S. Cl. ....................................... 285/21; 285/156; 285/197; 137/318
[58] Field of Search .................. 285/21, 197, 180, 156, 285/423; 156/379.7, 294, 158; 137/15, 318; 219/200, 201, 535, 547, 548

[56] References Cited

U.S. PATENT DOCUMENTS

| | | | |
|---|---|---|---|
| 2,998,269 | 8/1961 | Houghton | 285/423 |
| 3,434,745 | 3/1969 | Jackman | 285/423 |
| 3,649,055 | 3/1972 | Nilsen | 285/21 |
| 3,891,247 | 6/1975 | Smith | 285/197 |
| 3,987,276 | 10/1976 | Vogelsanger et al. | 156/379.7 |
| 4,059,291 | 11/1977 | Acda et al. | 285/197 |
| 4,436,987 | 3/1984 | Thalmann et al. | 285/21 |
| 4,455,482 | 6/1984 | Grandclément | 156/379.7 |
| 4,515,177 | 5/1985 | Thalman et al. | 285/21 |

FOREIGN PATENT DOCUMENTS

| | | | |
|---|---|---|---|
| 88703 | 9/1983 | European Pat. Off. | 285/21 |
| 0088703 | 9/1983 | European Pat. Off. | |
| 145581 | 6/1985 | European Pat. Off. | 285/21 |
| 2533902 | 2/1976 | Fed. Rep. of Germany | 285/423 |
| 1432635 | 2/1966 | France | 285/197 |
| 2519578 | 7/1983 | France | |
| 7014125 | 3/1972 | Netherlands | 285/21 |
| 528697 | 11/1972 | Switzerland | 285/21 |
| 570577 | 12/1975 | Switzerland | |
| 837399 | 6/1960 | United Kingdom | 285/197 |

*Primary Examiner*—Cornelius J. Husar
*Assistant Examiner*—Anthony Knight
*Attorney, Agent, or Firm*—Toren, McGeady and Goldberg

[57] ABSTRACT

A molded tapping member for connecting a branch line to a pipeline includes a U-shaped saddle piece with a shell-shaped bight section and a pair of laterally spaced legs each extending outwardly from an opposite end of the bight section. The legs are formed of partial sections connected to one another by a film hinge. After positioning the tapping member on the pipeline by moving it radially toward the pipeline axis, the bight section and the legs are pressed around the pipeline. A heating wire mat is incorporated into the U-shaped saddle piece so that it fits closely around the pipeline for welding the tapping member to the pipeline. With the construction of this saddle piece a uniform welding pressure can be established during the welding operation.

9 Claims, 4 Drawing Figures

MOLDED TAPPING MEMBER FORMED OF A WELDABLE PLASTICS MATERIAL

BACKGROUND OF THE INVENTION

The present invention is directed to a molded tapping member made of a weldable plastic material and formed of a U-shaped saddle piece arranged to be mounted on the pipeline with a tapping connection member and a branch connection secured to the saddle piece.

A similar molded tapping member is disclosed in Switzerland patent publication No. A-570577 and is formed of two shell-shaped parts connected together in an articulated manner by means of a film hinge, the two shell-shaped parts form a unit. To place the molded tapping member on a pipeline located in a ditch or trench, the lower shell-shaped part must be bent to a considerable degree or the tapping member must be slipped onto the pipeline from the side with tensioning members being applied to the opposite side for pressing the two shell-shaped parts against the pipe during the welding operation.

Such an assembly of the tapping member requires a rather large open space along the side of the pipeline whereby a more extensive removal of earth is required than would ordinarily be necessary to gain access to the pipeline itself. A simpler and more mechanized placement and welding of this molded tapping member on the pipeline is not possible. Another disadvantage in various constructions involves the arrangement of the wires of the heating or resistance wire mat which must be cut during the tapping operation with a drilling or cutting tool for use on plastic material. Further, there has been no arrangement of the tapping member which is particularly concerned with the favorable flow of the fluid medium from the pipeline into the branch line.

SUMMARY OF THE INVENTION

Therefore, it is the primary object of the present invention to provide a molded tapping member of the type described above which is formed as a monolithic unit so that it can be placed on the pipeline in the radial direction relative to the axis of the pipeline, that is, downwardly from above, and affords a complete welding connection to the pipeline. The placement and attachment of the tapping member on the pipeline is assured in a simple manner with a small space requirement and can be automated with suitable means.

In accordance with the present invention, the shell-shaped saddle piece is formed as a U-shaped member with a circumferentially extending bight portion and legs extending outwardly from the opposite ends of the bight portion. The legs are formed of individual partial sections interconnected by film hinges so that the saddle piece can be applied around the pipeline in a simple and effective manner. In addition, the heating wire mat is incorporated into the U-shaped saddle piece so that it assures an effective welding of the tapping member to the pipeline and does not interfere with the tapping connection.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
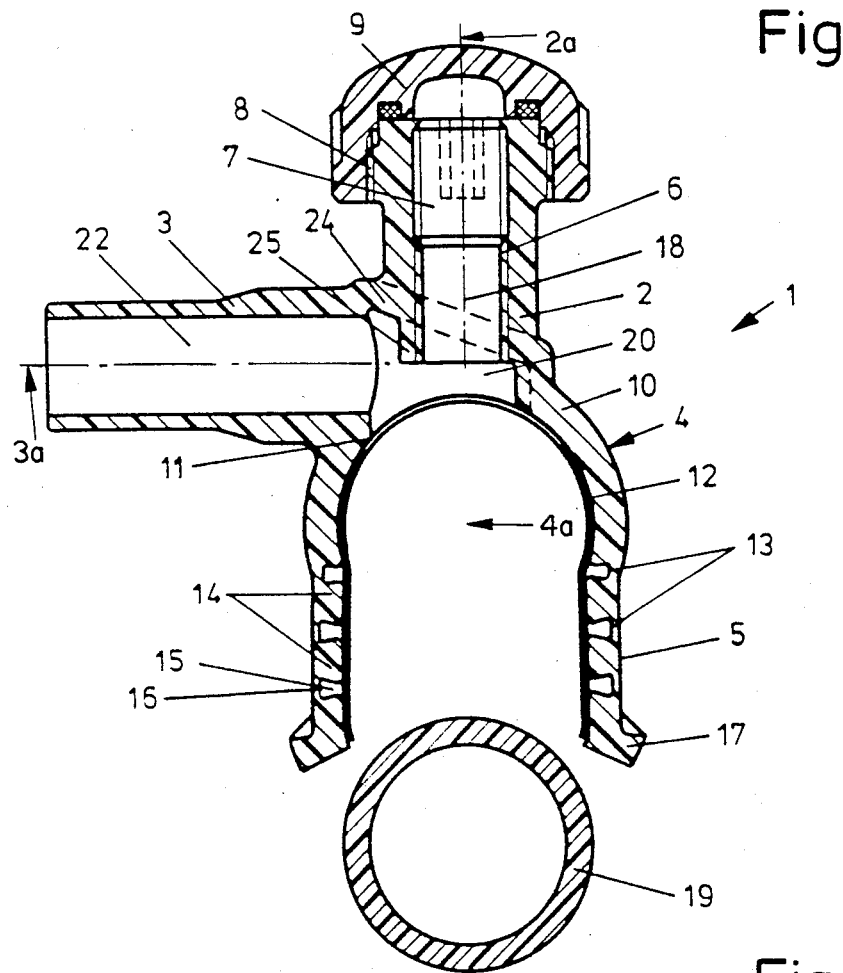
FIG. 1 is a sectional view of a molded tapping member arranged to be placed on a pipeline.

A monolithic molded tapping member 1 formed of a moldable plastic material includes an axially extending tubular tapping connection member 2, with an axis 2a an axially extending branch connection 3 with an axis 3a and a U-shaped saddle piece 4 including two oppositely disposed legs 5. The saddle piece has an axis 4a. As shown in FIG. 1 the tapping member 1 is arranged to be positioned on the pipeline 19. The axis 4a of the U-shaped saddle piece 4 extends generally in parallel relation with the axis of the pipeline in the mounted position. The axis 2a of the tapping connection member extends transversely of the axis 4a of the U-shaped saddle piece and the axis of the branch connection 3 extends transversely of both the U-shaped saddle piece axis 4a and the tapping connection member axis 2a. The tapping connection member 2 has an internal thread 6 for receiving a tapping tool 7 or a sealing plug, and it has an external thread 8 for screwing-on a sealing cap 9. The branch connection 3 extends laterally outwardly from the intersection of the tapping connection and the saddle piece and can be connected to an additional branch line, not shown, by a welding connection. The tubular branch connection 3 forms a passageway 22 through which a medium flowing through the pipeline 19 can enter into the branch line, not shown, after the tapping connection has been made.

As viewed in FIG. 1, the U-shaped saddle piece 4 has an upper shell-shaped part 10 having a circumferentially extending inner surface 11 which extends for an angular extent somewhat greater than 180°. A part of the outside surface of the shell-shaped part 10 also extends along a circular arc. The circumferential inner surface 11 is arranged to extend around a part of the circumference of the pipeline 19 and also extends in the axial direction of the pipeline. The angular extent of the circumferentially extending inner surface 11 of the shell-shaped part 10 is arranged so that the molded tapping member can be mounted on the pipeline in a resilient manner with a heating wire mat 12 located on the inner surface 11 so that it bears against the outside surface of the pipeline 19. In effect, the shell-shaped part 10 has a snapping or gripping action when it is placed on the outside of the pipeline.

In the embodiment shown in the drawing, the angular extent of the inner surface 11 of the shell-shaped part 10 is approximately 210°. The U-shaped saddle piece includes the shell-shaped part 10 which forms the bight portion of the U-shaped member with a pair of legs 5 disposed in laterally spaced relation and each extending from an opposite end 10a of the bight portion or shell-shaped part 10. Each leg is connected to the shell-shaped part 10 in an articulated or flexible manner by a film hinge or joint 13. As viewed in FIG. 1, the legs 5 extend linearly and symmetrically to the tapping axis, that is the axis 18 which projects downwardly through the shell-shape part 10 of the U-shaped saddle piece 4. Each leg is made up of a number of partial sections 14 connected to one another by flexible joints 13 or film hinges. Each of the joints 13 is formed by a dovetailed groove 15 provided in the inside surface of the leg with the groove extending in the axial direction of the pipeline and of the U-shaped saddle piece. A thin web 16 extends between the base of the groove 15 and the outside surface of the leg so that a flexible connection is provided between the individual partial sections 14 of the legs. With the film hinge joints provided in the U-shaped saddle piece 4, a simple monolithic production of the molded tapping member can be effected from plastic material in an injection molding procedure. The free end of each of the legs 5, that is, the lower ends of the legs as viewed in FIG. 1, form clamping flanges 17.

Figure 3:
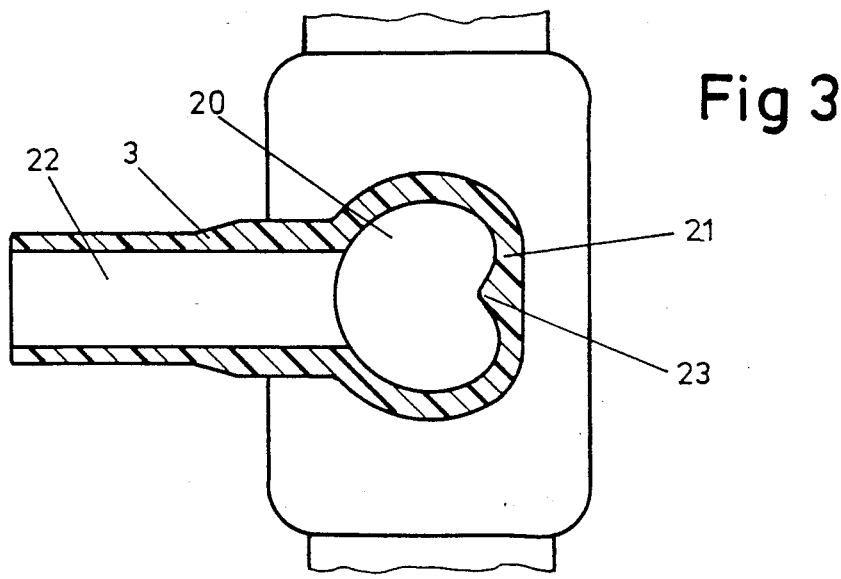
FIG. 3 is a sectional view taken along the line III—III in FIG. 2.

Due to the manner in which the U-shaped saddle piece 4, the branch connection 3 and the tapping connection member 2 intersect at the crown of the saddle piece, a chamber 20 is formed within the tapping member so that flow can pass in a favorable manner from the interior of the pipeline into a branch line connected to the branch connection. The chamber 20 opens through the inner surface 11 of the saddle piece 4 so that it encircles the tapping connection opening made into the pipeline 19. As viewed in FIG. 3, the chamber 20 is substantially round in section transverse to the tapping axis 18, however, on the side of the chamber located opposite the passageway 22 in the branch connection 3, the cross-section 21 is flattened and has an inwardly directed flow projection 23 aligned with the axis 3a of the passageway 22 in the branch connection 3.

Figure 2:
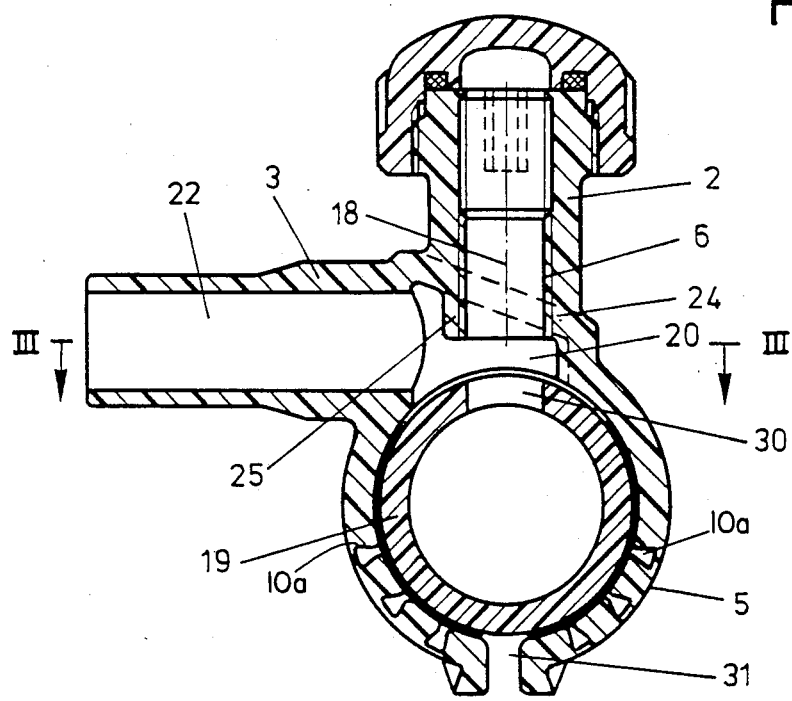
FIG. 2 is a cross-sectional view similar to FIG. 1, however, illustrating the molded tapping member placed on and secured around the pipeline.

As illustrated in FIGS. 1 and 2, the upper portion of the chamber 20 is bounded from the upper edge or crown of the passageway 22 in the branch connection 3 by an upper chamber wall 24 inclined downwardly toward the opposite side of the chamber, that is, toward the flattened cross-section 21. The tapping connection 2 projects into the chamber below the upper chamber wall 24 with its lower end 25 located in the chamber so that the internal thread 6 has a straight end and is relatively close to the pipeline at the position of the tapping connection, that is, the opening 30 shown through the pipeline 19 in FIG. 2.

Figure 4:
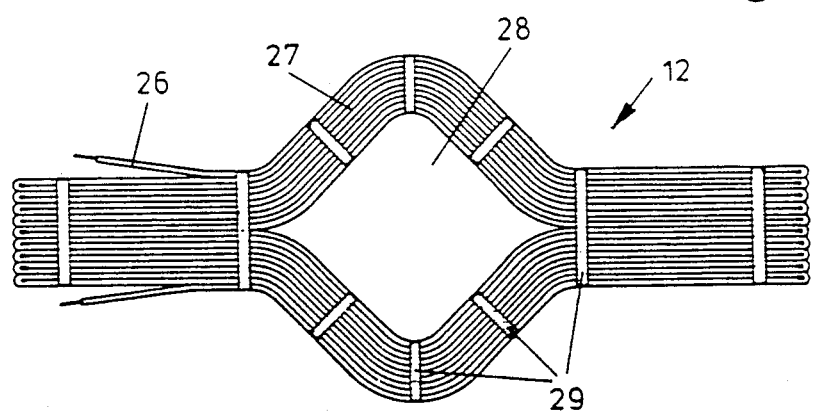
FIG. 4 is a top view of the heating wire mat shown in the flat planar condition.

In FIG. 4 the heating or resistance wire mat 12 is shown in the flattened or planar condition as compared to the circular arc condition it assumes around the inside surface of the U-shaped saddle piece 4. The wire mat 12 is formed by a heating wire 26 sheathed in a plastic material. The heating wire is bent into a number of sections with the sections lying alongside one another in a monofilament winding of the heating mat. As shown in FIG. 4, intermediate the ends of the individual sections of the heating wire the sections are bent in a zig-zag form so that an opening 28 is provided through the mat between two arc-shaped parts 27. The sections of heating wire 26 extending alongside one another are interconnected by welding strips 29 which extend transversely of the direction of the heating wire sections. The heating wire mat is placed in the saddle piece 4 so that its opening 28 is located about the tapping connection 30 through the pipeline 19. Preferably, the heating wire mat 12 is secured in the saddle piece 4 so that it is located symmetrically about both sides of the crown line of the bight portion or shell-shaped part 10. Short circuits are avoided by the monofil winding of the heating wire mat 12.

As can be noted in FIG. 1, the molded tapping member 1 is placed downwardly on the pipeline 19 so that the U-shaped saddle piece 4 and the similarly bent heating wire mat 12 move radially toward the axis of the pipeline. Generally speaking, the tapping member 1 moves in the direction of the tapping axis 18 which extends generally perpendicularly to the axis of the pipeline 19. Initially, the two legs 5 move downwardly over the pipeline and, after the engagement of the arcuately shaped inside surface 11 of the shell-shaped part 10, the legs are pressed inwardly against the outside surface of the pipeline by means of a tensioning tool or tensioning device acting on the tensioning flanges 17. As a result, the requisite contact pressure of the tapping member 1 on the pipeline 19 is maintained during the welding operation. During the attachment of the tapping member 1 on the pipeline 19 the gap 31 between the free ends of the legs 5, that is, between the flanges 17 is somewhat reduced. The clamping force acting on the U-shaped saddle piece 4 produces a tension action in the circumferential direction of the saddle piece with the saddle piece and the heating mat being pressed inwardly around the pipe affording the necessary melting pressure during the welding operation. After the tapping connection 1 has been welded onto the pipeline 19, the opening 30 through the pipeline, note FIG. 2, is effected by the tapping tool 7 and the branch connection 3 can be joined to a branch line also by a welded connection. Since the wires in the heating or resistance wire mat are arranged about the opening 28 through the mat the tapping connection can be effected without cutting any of the wires in the mat whereby the cutting procedure is significantly simplified.

After the tapping connection is made, the medium flowing in the pipeline 19 can pass through the opening 30 where it is deflected within the chamber 20 into the branch connection 3 and then into the branch line. The construction of the chamber 20 facilitates the flow from the pipeline to the branch line.

Since the molded tapping member 1 can be placed onto the pipeline 19 in the radial direction of the pipeline, that is, downwardly, as viewed in FIG. 1, a less extensive removal of earth from a trench is required for gaining access to the pipeline. The placement of the tapping member on the pipeline is substantially simplified and can be automated with the proper tool along with the subsequent pressing action around the pipeline. If appropriately suitable auxiliary devices are available, the work can be carried out from above the ditch or trench in which the pipeline is located without any of the workers having to enter downwardly into the trench. Accordingly, the replacement of branch lines for pipelines which are already in place is significantly simplified and is made less expensive with a connection which is of the same or better quality.

While specific embodiments of the invention have been shown and described in detail to illustrate the application of the inventive principles, it will be understood that the invention may be embodied otherwise without departing from such principles.

I claim:

1. Molded tapping member formed of a weldable plastic material for connecting at least one branch line to a pipeline formed of a weldable plastic material, comprising an axially extending saddle piece mountable on the pipeline by moving said saddle piece radially relative to the axial direction of the pipeline so that in the mounted position said saddle piece axis extends in generally parallel relation with the pipeline axis, an axially extending tapping connection member connected to said saddle piece with the axis of said tapping connection disposed transversely of the saddle piece axis and said tapping connection member extending outwardly from said saddle piece, an axially extending branch connection connected to and extending outwardly from said saddle piece and from said tapping connection member with the axis of said branch connection extending transversely of the axes of said saddle piece and tapping connection member, a heating wire mat incorporated in said molded tapping member for welding said tapping member to the pipeline, wherein the improvement comprises that said saddle piece has an inside surface arranged closely adjacent to the outside surface of said pipeline when said molded tapping member is mounted on the pipeline and an outside surface, said saddle piece is U-shaped having a bight portion extending in the axial direction of said saddle piece and said bight portion having laterally spaced ends extending in the axial direction of said saddle piece, and a pair of laterally spaced legs extending in the axial direction of said saddle piece and each projecting outwardly from an opposite end of said bight portion in the direction extending generally away from said tapping connection, each said leg being formed of a plurality of partial sections with joints interconnecting said partial sections and said partial sections and joints extending in the axial direction of said saddle piece, and said legs formed by said partial sections and joints being displaceable inwardly against the outside surface of the pipeline, and the axes of said tapping connection member and said branch connection intersect outwardly from the inside surface of said saddle piece.

2. Molded tapping member, as set forth in claim 1, wherein said U-shaped saddle piece is arranged symmetrically relative to a plane containing the axis of said tapping connection member and the axis of said saddle piece.

3. Molded tapping member, as set forth in claim 1 or 2, wherein each said leg has at least two said partial sections interconnected to one another and to said bight portion by film hinges in an articulated manner and said partial sections being of approximately the same dimension in the direction of said legs extending outwardly from said bight portion.

4. Molded tapping member, as set forth in claim 3, wherein the inside surfaces of said legs disposed in facing relation, and said film hinges being formed by dovetail shaped axially extending grooves in said legs extending from the inside surface toward the outside surface thereof with a thin web remaining between the base of said grooves and the outside surface of said legs.

5. Molded tapping member, as set forth in claim 1 or 2, wherein the intersection of said saddle piece, said tapping connection member and said branch connection forms a chamber open through the inside surface of said saddle piece and the interior surface of said chamber being formed to facilitate flow from the pipeline into said branch connection.

6. Molded tapping member, as set forth in claim 5, wherein said chamber in section perpendicular to the axis of said tapping connection member is substantially round with a flattened portion located in alignment with and opposite said branch connection and with a flow projection extending inwardly from said flattened portion toward said branch connection.

7. Molded tapping member, as set forth in claim 6, wherein the surface of said chamber spaced outwardly from said saddle piece in the direction of the axis of said tapping connection member is defined by an inclined chamber wall extending transversely of the axis of said tapping connection member from said branch connection to said flattened portion of the inside surface of said chamber, and said inclined chamber wall being inclined toward said saddle piece in the direction from said branch connection toward said flattened portion.

8. Molded tapping member, as set forth in claim 1 or 2, wherein a heating wire mat is provided in the inside surface of said saddle piece with said mat being formed by heating wires bent to form an opening extending around and spaced outwardly from the axis of said tapping connection member so that when a tapping tool is inserted into said tapping connection member the tool can cut a hole through the pipeline within said saddle piece without cutting through said heating wire mat.

9. Molded tapping member, as set forth in claim 8, wherein said heating wire mat is fixed to said saddle piece so that it extends generally symmetrically on both sides of a plane containing the axis of said saddle piece and the axis of said tapping connection member.

* * * * *